(12) United States Patent
Okada et al.

(10) Patent No.: US 7,120,306 B2
(45) Date of Patent: Oct. 10, 2006

(54) IMAGE PROCESSING METHOD AND IMAGE CODING APPARATUS UTILIZING THE IMAGE PROCESSING METHOD

(75) Inventors: Shigeyuki Okada, Oogaki (JP); Hideki Yamauchi, Oogaki (JP)

(73) Assignee: Sanyo Electric Co., Ltd., Osaka (JP)

( * ) Notice: Subject to any disclaimer, the term of this patent is extended or adjusted under 35 U.S.C. 154(b) by 749 days.

(21) Appl. No.: 10/391,020

(22) Filed: Mar. 19, 2003

(65) Prior Publication Data

US 2003/0179943 A1    Sep. 25, 2003

(30) Foreign Application Priority Data

Mar. 19, 2002   (JP)   ............... 2002-077099

(51) Int. Cl.
G06K 9/36 (2006.01)
G06K 9/46 (2006.01)

(52) U.S. Cl. ................................. 382/240

(58) Field of Classification Search ........... 382/164, 382/173, 232, 240, 247, 250, 251, 260, 263, 382/264, 276, 305; 375/240.03, 240.11, 375/240.15, 240.19, 240.2, 240.21, 240.23, 375/240.29; 348/180, 607; 714/756, 822
See application file for complete search history.

(56) References Cited

U.S. PATENT DOCUMENTS

| | | | | |
|---|---|---|---|---|
| 5,798,794 A | * | 8/1998 | Takahashi | 375/240.11 |
| 5,896,176 A | * | 4/1999 | Das et al. | 375/240.15 |
| 6,628,716 B1 | * | 9/2003 | Tan et al. | 375/240.19 |
| 6,678,422 B1 | * | 1/2004 | Sharma et al. | 382/240 |
| 2002/0141499 A1 | * | 10/2002 | Goertzen | 375/240.12 |
| 2003/0108248 A1 | * | 6/2003 | Huang et al. | 382/240 |
| 2003/0179943 A1 | * | 9/2003 | Okada et al. | 382/240 |

FOREIGN PATENT DOCUMENTS

| | | |
|---|---|---|
| JP | 2001-197498 | 7/2001 |
| JP | 2001-258027 | 9/2001 |
| JP | 2002-223446 | 8/2002 |
| WO | WO 99/57908 | 11/1999 |
| WO | WO 99/57908 A | 11/1999 |

OTHER PUBLICATIONS

Chinese Office Action for Application No. 03107468.5 and translation dated Dec. 10, 2004.
Office Action for Corresponding Japanese Patent Application No. JP 2002-077099 dispatched Nov. 1, 2005.

* cited by examiner

*Primary Examiner*—Amir Alavi
(74) *Attorney, Agent, or Firm*—McDermott Will & Emery LLP

(57) ABSTRACT

A wavelet transform is applied to an original image, so as to generate an image of a first hierarchy. Among the thus generated image of the first hierarchy, each of high-frequency sub-band components 1HL, 1LH and 1HH are immediately quantized and coded so as to be temporarily stored in a coded data storage. Another wavelet transform is applied to an LL sub-band component, among the image of the first hierarchy, so as to generate an image of a second hierarchy. Thereafter, an image of a third hierarchy is generated from an LL sub-band component in the image of the second hierarchy. During such a process, quantization and coding processings are performed in parallel with transformation processings. After all processings are completed and the coded data are prepared, coded image data complying with the JPEG2000 standard are generated by first reading out low-frequency components in sequence from the prepared coded data.

20 Claims, 3 Drawing Sheets

IMAGE PROCESSING METHOD AND IMAGE CODING APPARATUS UTILIZING THE IMAGE PROCESSING METHOD

BACKGROUND OF THE INVENTION

1. Field of the Invention

The present invention relates to an image processing technology, and it particularly relates to an image processing method and an image coding apparatus utilizing the image processing method.

2. Description of the Related Art

In the twentieth century, which was often called "The Century of Images," a great variety of pictures and images were produced and put to use in movies, TV broadcasts and so forth. During the 1990's in particular, the widespread use of PCs (personal computers) and other information equipment, the popularization of digital cameras, color printers and so forth and the explosive increase in the use of the Internet accounted for deep infiltration of the culture of digital images into everyday life of ordinary people. Under these circumstances, coding and compression technologies, such as JPEG (Joint Photographic Expert Group) for still images and MPEG (Motion Picture Expert Group) for moving images, have been standardized so as to improve the facility of distribution and reproduction of the images through recording media, such as CD-ROM, and transmission media, such as networks and broadcasting waves. JPEG2000, which is an advanced version in the JPEG series, has already been announced, and the middle- to long-term targets for MPEG have already been worked out, too. Therefore, the on-going and future sophistication of image processing technologies will without doubt lead us deeper into the world of digital images.

The technological advance in such apparatuses as digital cameras and scanners that produce image data is so remarkable that images with higher resolution and higher quality can be acquired very easily. As the resolution of images becomes higher, the data amount increases as might be expected and the coding technology is expected to play a very important role to cope with this increased amount of image data. Though efforts to seek the excellent data structures are to be made constantly of course on one hand, the improved efficiency in processing the coding compression, that is, the technology by which to realize coding compression processing with further reduced processing time and minimum hardware resource is very much in demand, on the other hand.

SUMMARY OF THE INVENTION

The present invention has been made in view of the foregoing circumstances and an object thereof is to provide a technology which can improve the efficiency of an image processing or an image coding processing in particular, shorten the processing time and reduce hardware required for the processing.

A preferred embodiment according to the present invention relates to an image processing method. This image processing method includes: converting an image to spatial frequency components; and quantizing the spatial frequency components obtained by the converting, wherein the converting performs a conversion processing that is of a form such that low frequency components of the image are obtained at a subsequent processing stage, and wherein the quantizing is such that, during a processing by the converting, every time higher spatial frequency components are obtained, the thus obtained higher spatial frequency components are quantized in sequence. As an example of the conversion processing that is of a form such that low frequency components of the image are obtained at the subsequent processing stage, there is a wavelet transform which is utilized in the image coding under the JPEG2000 format. The time required for a coding processing can be shortened by not shifting to the quantizing upon completion of all the converting but by performing the quantizing in parallel with the converting. Moreover, since the spatial frequency components on which the coding has already been completed are no longer required to be in storage, a region corresponding to these spatial frequency components can be overwritten and put to some other use, thus contributing to the reduction of the required memory capacity.

This image processing method may further include: coding, in sequence, data of the spatial frequency components quantized by the quantizing, and then storing the thus coded data in a memory. This image processing method may further include: reading out the coded data stored in the memory starting from lower frequency spatial frequency components thereof after completing the converting, the quantizing and the coding, and then generating coded image data. By storing the coded data in the memory, the coded image data can be generated by rearranging the order of the coded data.

Another preferred embodiment according to the present invention relates to an image coding apparatus. This image coding apparatus comprises: a conversion unit which converts an image into spatial frequency components; and a quantizer which quantizes the spatial frequency components obtained by the conversion unit, wherein the conversion unit performs a conversion processing that is of a form such that low frequency components of the image are obtained after high frequency components of the image are obtained, and wherein the quantizer quantizes, in sequence, the spatial frequency components outputted from the conversion unit, without waiting for the completion of a processing by the conversion unit.

This image coding apparatus may further comprise: a coder which codes, in sequence, data of the spatial frequency components quantized by the quantizer; and a coded data storage which temporarily stores the coded data generated by the coder, in order to rearrange the coded data in a predetermined sequence. This image coding apparatus may further comprise: a stream generator which reads out, in a predetermined sequence, the coded data stored in the coded data storage and generates coded image data. The stream generator may generate coded image data having a data structure such that lower frequency components appear first.

It is to be noted that any arbitrary replacement or substitution of the above-described structural components, and expressions converted between a method, an apparatus, a system, a computer program, a recording medium or the like are all effective as and encompassed by the present embodiments.

Moreover, this summary of the invention does not necessarily describe all necessary features so that the invention may also be sub-combination of these described features.

DETAILED DESCRIPTION OF THE INVENTION

The invention will now be described based on the preferred embodiments, which do not intend to limit the scope of the present invention, but exemplify the invention. All of the features and the combinations thereof described in the embodiments are not necessarily essential to the invention.

The following preferred embodiments relate to image coding that utilizes JPEG2000 as a form of image processings. Hereinbelow, no detailed description will be given of JPEG2000 whose outline is known widely.

Figure 1:
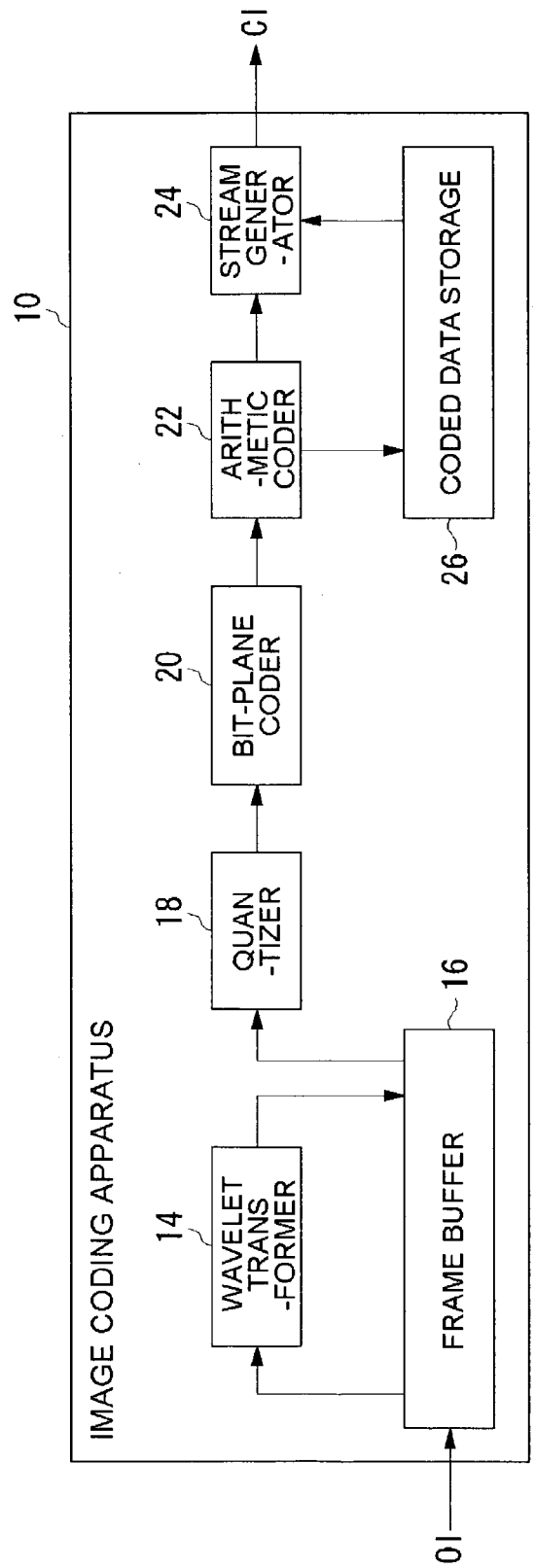
FIG. 1 shows a structure of an image coding-apparatus according to an embodiment of the present invention.

FIG. 1 shows a structure of an image coding apparatus 10 according to an embodiment of the present invention. In terms of hardware, this structure can be realized by a CPU, a memory and other LSIs of an arbitrary computer. In terms of software, it is realized by memory-loaded programs or the like having coding functions therein. Described and shown here are functional blocks that are realized in cooperation with such components. Thus, it should be understood by those skilled in the art that these functional blocks can be realized in a variety of forms by hardware only, software only or the combination thereof.

The image coding apparatus 10 carries out coding processings based on the specifications of JPEG2000. The image coding apparatus 10 is comprised principally of a wavelet transformer 14, a frame buffer 16, a quantizer 18, a bit-plane coder 20, an arithmetic coder 22, a coded data storage 26 and a stream generator 24. The frame buffer 16 is utilized as a work area for an image coding processing, and the coded data storage 26 stores temporarily the coded data which will be later rearranged. As will be described later, the frame buffer 16 and the coded data storage 26 may be substituted by a single common storage.

Figure 2:
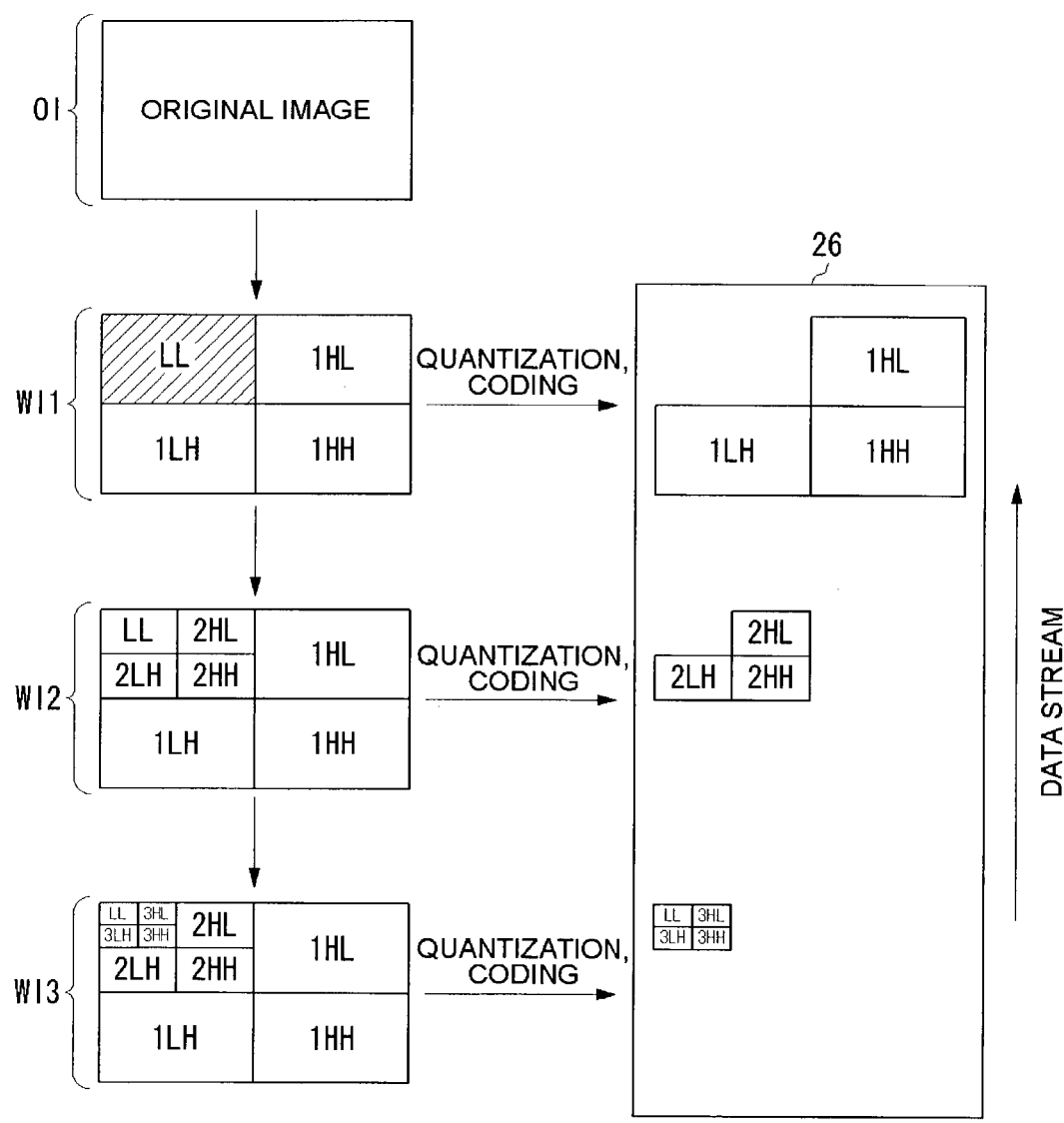
FIG. 2 illustrates how an original image is transformed by a wavelet transformer, and how the transformed spatial frequency data are converted to coded image data via quantization and coding processes.

At the start of a coding processing, an original image OI is loaded into the frame buffer 16. The original image OI loaded into the frame buffer 16 is hierarchized by the wavelet transformer 14. The wavelet transformer 14 in JEPG2000 utilizes Daubechies filters. Referring to FIG. 2, this filter operates as both a low-pass filter and a high-pass filter simultaneously in the respective x and y directions of an image, and divides a single image into four frequency sub-bands. These sub-bands are an LL sub-band which has low-frequency components in both x and y directions, an HL sub-band and an LH sub-band which have a low-frequency component in one of the x and y directions and a high-frequency component in the other, and an HH sub-band which has high-frequency component in both x and y directions. The number of pixels in the vertical and horizontal directions of each sub-band is ½ of that of the image before the processing, and one time of filtering produces sub-band images whose resolution, or image size, is ¼ of the original image.

The wavelet transformer 14 carries out another filtering processing to the image of the LL sub-band among the thus obtained sub-bands, so as to divide it into another four sub-bands LL, HL, LH and HH. The filtering is performed a predetermined number of times, and the LL sub-band generated by the last filtering is acquired as the image closest to a DC component of the original image OI. The four sub-bands on the same hierarchy, namely, those obtained after the same number of filterings has been performed thereon, contain lower frequency components from HH to HL and LH to LL. As the hierarchy goes down to a deeper level, images containing further lower frequency components will be generated. Illustrating this by an example shown in FIG. 2, hierarchized images containing further lower frequency components are obtained as a hierarchical position moves from the right below toward the upper left.

The quantizer quantizes spatial frequency components outputted from the wavelet transformer 14. The bit-plane coder 20 and the arithmetic coder 22, which are an example of a coder, encode the quantized spatial frequency data. The coded data storage 26 temporarily stores the coded data outputted from the arithmetic coder 22 in order that the coded data may be rearranged in a predetermined sequence. The stream generator 24 reads out, in a predetermined sequence, the coded data stored in the coded data storage 26, and then generates coded data stream. In this manner, final coded images CI are outputted.

FIG. 2 illustrates how the original image OI is transformed by the wavelet transformer 14, and how the transformed spatial frequency data are converted to the coded image data CI via quantization and coding processes. The original image OI becomes an image WI1 of a first hierarchy by a first time filtering carried out by the wavelet transformer 14. Here, sub-bands HL, LH, HH at the n-th hierarchy are denoted by nHL, nLH and nHH, respectively. Another filtering is performed on an LL sub-band of this image WI1 so as to produce an image WI2 of a second hierarchy. In the similar manner, still another filtering will be carried out repeatedly. In an example shown in FIG. 2, the filtering-performed images are produced up to an image WI3 of a third hierarchy.

As described above, the LL sub-band generated in the last filtering process is most close to the DC component in the original image, and is most important information. Thus, considering the possibility of errors caused in a data transmission and communication troubles, and in order to realize a progressive display, it is desirable to have a data structure such that the low-frequency components appear first starting from the final LL sub-band having the highest importance whereas the high-frequency components appear later. In a conversion processing of the wavelet transformer 14, however, the higher frequency components are obtained first while the lower frequency components are obtained at a subsequent stage as shown in FIG. 2. Here, if the quantization and coding processings are performed after the conversion processing by the wavelet transformer 14 is all completed and the final LL sub-band are outputted, both quantization process and coding process, which take as much time as required for the conversion processing, will take much time from the start until the completion of the processing (especially when images with large amounts of data are to be processed), so that the quantization and coding processes are not efficiently done.

In consideration of these problems, according to the present embodiment, every time the spatial frequency components of further higher frequency are obtained, those components are quantized and coded in sequence and then temporarily stored in the coded data storage 26. In other words, the quantization and coding processings are conducted in parallel with the conversion processing, without having waited for the completion of the conversion processing. Then, after the respective processes of conversion, quantization and coding are all completed, the coded data stored in the coded data storage 26 are read out in sequence from the low-frequency components to the high-frequency components, namely, in the reverse sequence of the above-mentioned processing order, so as to generate the coded image data CI.

Figure 3:
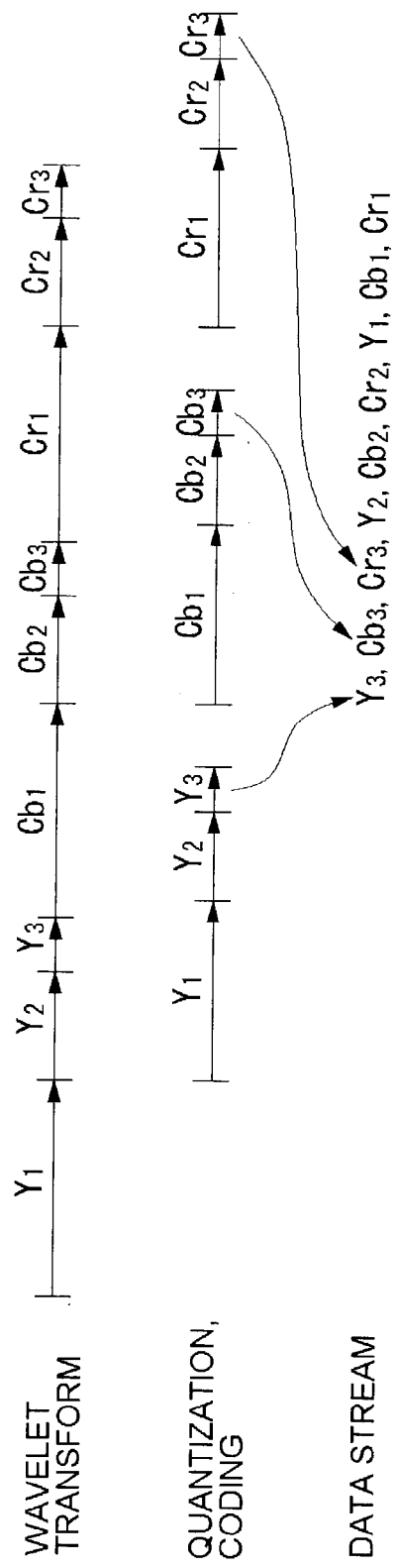
FIG. 3 shows timing relations between a wavelet transform processing and quantization and coding processings.

FIG. 3 shows timing relations between a wavelet transform processing and quantization and coding processings. The wavelet transform is performed respectively on a luminance signal Y, color-difference signals Cb and Cr of an image. First, the wavelet transformer 14 performs the wavelet transform processing on the luminance signal Y, as shown in FIG. 2, so as to generate a spatial frequency component Y1 of a first hierarchy. Thereafter, a spatial frequency component Y2 of a second hierarchy and a spatial frequency component Y3 of a third hierarchy are generated in sequence. When the spatial frequency component Y1 of the first hierarchy is generated by the wavelet transformer 14, the quantizer 18 quantizes Y1 without waiting for the completion of the conversion processing. Moreover, the bit-plane coder 20 and the arithmetic coder 22 code the quantized data outputted in sequence at a stage when a quantization process by the quantizer 18 has completed, and store the coded quantized data in the coded data storage 26. Then, header information may be attached to the coded data in order to be able to identify data, for which Y1 is coded, when later reading out the coded data which are rearranged. Since this header information is utilized only when the stream generator 24 reads out the coded data, and is thus not attached to the coded image data CI to be outputted, this header information may be of an arbitrary form as long as it is identifiable by the stream generator 24. As for the color-difference signals Cb and Cr too, the quantization and coding processings are performed, in a similar manner, in parallel with the wavelet transform processing, so that the coded data are successively stored in the coded data storage 26.

After all processes of the wavelet transform, the quantization and the coding are completed and all coded data have been stored in the coded data storage 26, the stream generator 24 reads out the coded data starting successively from the low-frequency components so as to generate the coded image data CI. In an example shown in FIG. 3, the luminance signal Y3 and the color-difference signals Cb3 and Cr3 of the third hierarchy which are of lowest frequencies are read out first. Then, the data are rearranged in the order of Y2, Cb2 and Cr2 of the second hierarchy and Y1, Cb1 and Cr1 of the first hierarchy, as shown in FIG. 3, so that the coded image data CI are generated. A data structure of coded image data CI may be such that it is in the sequence of Y3, Y2, Y1, Cb3, Cb2, Cb1, Cr3, Cr2 and Cr1. In this case, too, the data structure is such that lower frequency components appear before higher frequency components, among the same signals.

According to a procedure illustrated in FIG. 3, the spatial frequency components stored in the frame buffer 16 are no longer needed after the spatial frequency components have been converted to the coded data by the quantization and coding processes, so that those spatial frequency components. may then be deleted from the frame buffer 16. Thus, the frame buffer 16 may be utilized for storing other data in a manner that the other data overwrite a storage region which stores the spatial frequency components that have already been converted to the coded data. Thereby, the memory size as a whole can be reduced. For example, if newly generated coded data are stored by overwriting the original image data, there is no need of providing the coded data storage 26 anew and the frame buffer 16 can be put to a common use, namely, the coded data storage 26 is no longer needed.

As have been described above, by implementing the image coding apparatus according to the present embodiments, the efficiency of the image coding processings are improved and the time required for the coding is shortened and thus the size of memory needed can be significantly reduced.

The present invention has been described based on some embodiments which are only exemplary, but the present invention is not limited to the scope described in those embodiments. It is understood by those skilled in the art that there exist other various modifications to the combination of each component and process described above and that such modifications are encompassed by the scope of the present invention.

Although the present invention has been described by way of exemplary embodiments, it should be understood that many changes and substitutions may be made by those skilled in the art without departing from the scope of the present invention which is defined by the appended claims.

What is claimed is:

1. An image processing method, including:
    converting an image to spatial frequency components; and
    quantizing the spatial frequency components obtained by said converting,
    wherein said converting performs a conversion processing that is of a form such that low frequency components of the image are obtained at a subsequent processing stage, and
    wherein said quantizing is such that, during a processing by said converting, every time higher spatial frequency components are obtained, the thus obtained higher spatial frequency components are quantized in sequence.

2. An image processing method according to claim 1, further including:
    coding, in sequence, data of the spatial frequency components quantized by said quantizing, and then storing the thus coded data in a memory.

3. An image processing method according to claim 2, further including:
    reading out the coded data stored in the memory starting from lower frequency spatial frequency components thereof after completing said converting, said quantizing and said coding, and then generating coded image data.

4. An image processing method according to claim 3, wherein the coded image data are image data complying with a JPEG2000 format.

5. An image processing method according to claim 4, wherein the conversion processing is a wavelet transform.

6. An image processing method according to claim 2, wherein the conversion processing is a wavelet transform.

7. An image processing method according to claim 3, wherein the conversion processing is a wavelet transform.

8. An image processing method according to claim 1, wherein the conversion processing is a wavelet transform.

9. An image coding apparatus, comprising:
    a conversion unit which converts an image into spatial frequency components; and
    a quantizer which quantizes the spatial frequency components obtained by said conversion unit,
    wherein said conversion unit performs a conversion processing that is of a form such that low frequency components of the image are obtained after high frequency components of the image are obtained, and wherein said quantizer quantizes, in sequence, the spatial frequency components outputted from said conversion unit, without waiting for the completion of a processing by said conversion unit.

10. An image coding apparatus according to claim 9, further comprising:
a coder which codes, in sequence, data of the spatial frequency components quantized by said quantizer; and
a coded data storage which temporarily stores the coded data generated by said coder, in order to rearrange the coded data in a predetermined sequence.

11. An image coding apparatus according to claim 10, further comprising:
a stream generator which reads out, in the predetermined sequence, the coded data stored in said coded data storage and generates coded image data.

12. An image coding apparatus according to claim 11, wherein said stream generator generates coded image data having a data structure such that lower frequency components appear first.

13. An image coding apparatus according to claim 12, wherein the coded image data are image data complying with a JPEG2000 format.

14. An image coding apparatus according to claim 13, wherein said conversion unit performs a wavelet transform.

15. An image coding apparatus according to claim 9, wherein said conversion unit performs a wavelet transform.

16. An image coding apparatus according to claim 10, wherein said conversion unit performs a wavelet transform.

17. An image coding apparatus according to claim 11, wherein the coded image data are image data complying with a JPEG2000 format.

18. An image coding apparatus according to claim 17, wherein said conversion unit performs a wavelet transform.

19. An image coding apparatus according to claim 11, wherein said conversion unit performs a wavelet transform.

20. An image coding apparatus according to claim 12, wherein said conversion unit performs a wavelet transform.

* * * * *